United States Patent Office 3,786,160
Patented Jan. 15, 1974

3,786,160
USE OF 2-HYDROXYMETHYL-3-HYDROXY-6-
(1-HYDROXY - 2-AMINOETHYL)-PYRIDINES
AS BRONCHODILATORS
Wayne E. Barth, New London, Conn., assignor to
Pfizer Inc., New York, N.Y.
No Drawing. Original application Feb. 16, 1971, Ser. No.
115,878, now Patent No. 3,700,681, dated Oct. 24,
1972. Divided and this application May 25, 1972, Ser.
No. 256,756
Int. Cl. A61k 27/00
U.S. Cl. 424—263                        10 Claims

ABSTRACT OF THE DISCLOSURE 2-hydroxymethyl - 3 - hydroxy - 6 - (1-hydroxy-2-aminoethyl)pyridines and salts thereof, a novel class of β-adrenergic agonist bronchodilators in mammals, and 2-hydroxymethyl - 3 - benzyloxy - 6 - pyridinecarboxaldehyde, a valuable intermediate in the preparation of the subject compounds.

CROSS-REFERENCE TO RELATED APPLICATION

This application is a divisional application of Ser. No. 115,878 filed Feb. 16, 1971 and now U.S. Pat. 3,700,681.

BACKGROUND OF THE INVENTION

Following the reported bronchodilator action of epinephrine by Matthews, Brit. Med. J., 1, 441 (1910) many research programs have been undertaken in an effort to uncover new, more effective, oral agents free of any other pharmacologic actions, the most detrimental of which are cardiovascular side effects.

Chen and Schmidt, J. Pharmacol. Exper. Therap., 24, 339 (1924) reported the use of the alkaloid ephedrine as an oral efficacious bronchodilator with the same spectrum of activity as epinephrine. In 1940, Konzett, Arch. Exp. Path. Pharmak., 197, 27 (1940), outlined the effects of the potent bronchodilator isoproterenol and in 1968 Dugan et al., J. Pharmacol. Exp. Ther., 164, 290 (1968) reported the pharmacology of soterenol, a bronchodilator of greater potency, duration and oral effectiveness.

Recently, Brittain et al., Nature, 219, 862 (1968) disclosed studies relating to salbutamol which suggested greater selectivity for pulmonary as opposed to cardiac tissue. Salbutamol and related congeners are claimed as bronchodilators in South African Pat. 67/5591.

A series of 1-(2'-halopyridyl)-2-aminoethanol analogs has been disclosed in Belgian Pat. 724,834 as therapeutic agents having cardiovascular activity with some members of the series possessing utility as bronchodilators.

This invention relates to 2-hydroxymethyl-3-hydroxy-6-(1-hydroxy-2-aminoethyl)pyridines, and more particularly to a series of substituted amino derivatives and salts thereof and to the use of said agents as bronchodilators in mammals. These agents are of particular interest because of their improved selectivity for pulmonary over cardiac tissue compared to similar agents in use today.

Also within the purview of the instant invention is 2-hydroxymethyl-3-benzyloxy-6 - pyridinecarboxaldehyde, a valuable intermediate employed in the synthesis of the subject compounds.

SUMMARY OF THE INVENTION

The bronchodilators of this invention are represented by the formula:

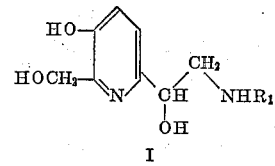

and the acid addition salts thereof wherein:

$R_1$ is selected from the group consisting of hydrogen, alkyl containing from 1 to 5 carbon atoms and phenylalkyl and substituted phenylalkyl wherein said alkyl group contains from 3 to 5 carbon atoms and said substituent is hydroxy, methoxy, 3,4-dimethoxy or 3,4-methylenedioxy.

Of particular interest, because of their outstanding potency and selectivity for pulmonary vs. cardiac tissue are analogs of Formula I where $R_1$ is alkyl containing 3 to 5 carbon atoms or substituted phenylalkyl wherein said alkyl contains from 3 to 5 carbon atoms and said substituent is methoxy.

Useful as an intermediate in the synthesis of the 2-hydroxymethyl - 3 - hydroxy - 6 - (1-hydroxy-2-aminoethyl) pyridine is the novel 2-hydroxymethyl-3-benzyloxy-6-pyridinecarboxaldehyde of Formula II:

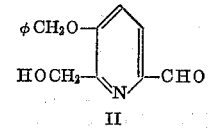

The scope of this invention is also meant to encompass congeners of I wherein $R_1$ is substituted alkyl containing from 3 to 5 carbon atoms said substiutent being selected from the group consisting of mono- and di(lower)alkylamino; phenyloxy and substituted phenyloxy, said substituent being hydroxy or methoxy; cycloalkyl containing from 3 to 7 carbon atoms; and heterocyclic ring, said heterocyclic ring containing one or more heteroatoms selected from the group consisting of sulphur, oxygen or nitrogen. Also useful as bronchodilators are compounds related to those of Formula I bearing an alkyl substituent on the carbon atom α- to the amino group as follows:

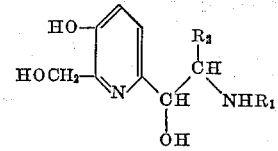

wherein $R_2$ is alkyl containing from 1 to 3 carbon atoms and $R_1$ is as previously indicated.

DETAILED DESCRIPTION OF THE INVENTION

In accordance with the process employed for the preparation of compounds of the instant invention the following scheme is illustrative:

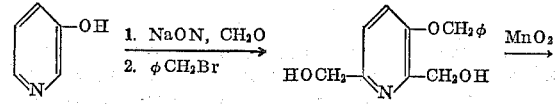

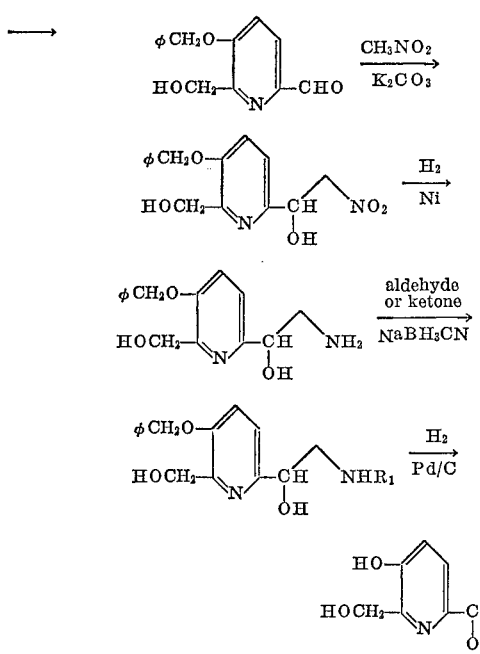

In the first reaction step of the aforementioned scheme 3-hydroxypyridine, a commercial reagent, is condensed with at least two moles of formaldehyde, to generate in situ the corresponding 2,6-bis(hydroxymethyl)-3-hydroxypyridine. Said reaction is most conveniently carried out in an aqueous solvent containing sodium hydroxide and at elevated temperatures, preferably 85–100° C., for 2–4 hours.

Without isolation of the bis(hydroxymethyl)adduct the reaction mixture is treated with at least one mole of a benzyl halide, e.g., benzyl bromide, and a water-miscible, unreactive solvent, generally ethanol, to assist in solubilizing the halide. As much as a 10–20% excess of benzyl halide can be employed without altering the course of the reaction which leads to the corresponding 3-benzyloxy-2,6 - bis(hydroxymethyl)pyridine. Reaction temperatures are not critical, longer reaction times being required for lower temperatures.

Isolation of the desired product is conveniently carried out by first removing in vacuo the ethanol solvent followed by extraction of the product with a water-immiscible solvent, such as chloroform. The product can be isolated by removal of the solvent. Alternatively, the product can be converted to the hydrochloride salt by treatment of the dried chloroform layer with gaseous hydrogen chloride until a precipitate no longer forms.

Addition of the 3 - benzyloxy-2,6-bis(hydroxymethyl) pyridine to a heated suspension of activated manganese dioxide in a reaction-inert solvent results in the oxidation of the 6-hydroxymehtyl substituent to a carboxaldehyde. A suitable solvent for said oxidation is refluxing benzene, in which case the reaction time required for completion is 5–10 times.

Filtration of the hot suspension followed by removal of the solvent results in isolation of the crude product, which can be further purified by chromatographing over silica gel.

Condensation of the above aldehyde with nitromethane in the presence of a ctalytic amount of potassium carbonate leads to the synthesis of 2-hydroxymethyl-2-benzyloxy-6-(1-hydroxy-2-nitroethyl)pyridine. Other nitroalkanes can be employed in said condensation and result in the corresponding 2-alkyl nitroalcohols. It is preferred that the nitroalkane be employed as the solvent, and is subsequently recovered at the completion of the reaction by removal from the product under reduced pressure.

Reduction of the nitro group of the above described nitroalcohol is effected using Raney nickel in a hydrogen atmosphere at an initial pressure of 50 p.s.i. and with cooling. When the up-take of hydrogen ceases, generally 1–2 hours, the solvent, preferably methanol, is removed in vacuo and the product separated from non-basic by-products by partitioning between chloroform and water containing 12 N hydrochloric acid. The aqueous layer is subsequently rendered basic with an aqueous solution of inorganic base, such as sodium hydroxide, and extracted with a water-immiscible solvent, e.g., benzene, toluene or chloroform. The product, isolated by removal of the solvent, can be employed directly in the next reaction without further purification.

Reductive alkylation of the above described aminoalcohol with aldehydes or ketones is carried out wtih the reducing agent sodium cyanoborohydride in a reaction-inert solvent, e.g., lower alkanols. Said reduction is effected in the presence of anhydrous hydrogen chloride at ambient temperature with a reaction time of 12–24 hours. Alternately, catalytic reductions employing hydrogen can also be employed.

Removal of the solvent followed by partition of the product between chloroform and water containing 12 N hydrchloric acid removes any non-basic by-products. The aqueous layer is subsequently made basic with aqueous sodium hydroxide and the product, as the free base, extracted into a water-immiscible solvent such as chloroform, methylene chloride or benzene. The solvent is removed and the residual product purified by recrystallization from a suitable solvent.

Products of the instant invention are prepared by removal of the protecting benzyl group from the above described 2-hydroxymethyl-2-benzyloxy-6(1-hydroxy-2-substituted aminoethyl)pyridine. Said reaction is preferably effected using 5% palladium on charcoal and hydrogen gas. Experimentally, the precursor in a methanol solvent is shaken in a hydrogen atmosphere at an initial pressure of 30–50 p.s.i. When hydrogen uptake is complete the catalyst is filtered and the free base converted to the desired diacid salt by treatment with two equivalents of the requisite acid.

The aforedscribed scheme is especially applicable to the preparation of compounds wherein the alkyl-carbon substituted on the amino moiety is primary or secondary. Products of the present invention wherein said alkylcarbon is tertiary, however, cannot be synthesized by the described scheme. Preparation of these analogs, as well as those wherein the amine is primary or secondary, is carried out by a modified route starting with 2-hydroxymethyl-3-benzyloxy-6-pyridinecarboxaldehyde and a tertiaryalkyl isonitrile, t—$R_2NC$, as follows:

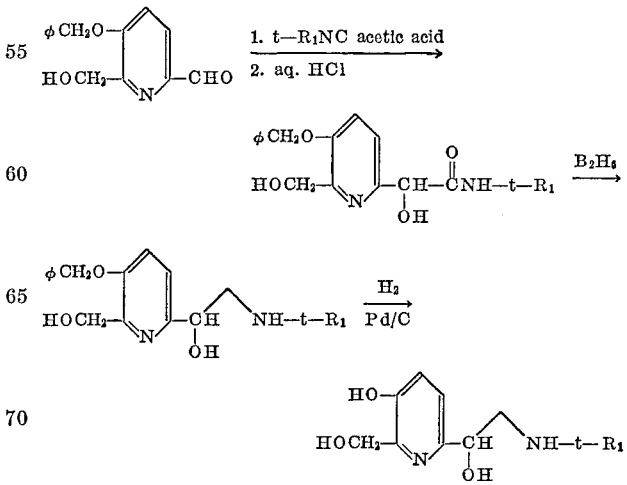

The first reaction of the above outlined route involves the reaction of the aforedescribed pyridinecarboxaldehyde derivatives with an isonitrile derived from a tert-amine. In practice, the aldehyde and isonitrile in a reaction-inert water-immiscible solvent, e.g., chloroform or benzene, containing acetic acid are heated to the reflux temperature of the solvent. Employing temperatures of 70–80° C. requires a reaction time of 2 to 6 hours, with longer reaction periods for lower temperatures. On completion of the reaction the acetic acid is removed by employing an aqueous sodium bicarbonate wash, and the non-aqueous layer is dried over a suitable drying agent and the solvent removed in vacuo. The product, N-tert-alkyl-2-(5-benzyloxy-6-hydroxymethyl-2-pyridyl)-2-acetoxyacetamide, can be used in subsequent reaction without further purification.

Hydrolysis of the acetoxy group is conveniently carried out by heating the above compound in dilute hydrochloric acid solution at steam bath temperatures for 1 to 2 hours.

Reduction of the hydroxyacetamide derivative to the corresponding aminoalcohol is effected in a reaction-inert solvent, preferably tetrahydrofuran, using the reducing agent diborane. Experimentally, the N-tert-alkyl-2-(5-benzyloxy - 6 - hydroxymethyl-2-pyridyl)-2-hydroxyacetamide in tetrahydrofuran is added over a 30 to 40 minute period to diborane in the same solvent and cooled to 0° C. After allowing the reaction mixture to stir for several hours at room temperature it is heated to reflux for 30 to 60 minutes, cooled, and treated with sufficient ethanolic hydrogen chloride to form the insoluble hydrochloride salt. Liberation of the free base is carried out by treatment of an aqueous solution of the salt with sufficient sodium hydroxide solution to provide a solution of pH 11. The basic product is subsequently extracted with a suitable water-immiscible solvent.

Debenzylation of the protecting group, the final step in the above described scheme, is effected in a manner as previously described wherein $R_1$ is derived from a primary or secondary alkyl group.

In both aforedescribed reaction schemes the benzyl blocking group of the key intermediate, 2-hydroxymethyl-3-benzyloxy-6-pyridinecarboxaldehyde, can be substituted by a wide variety of protecting groups familiar to those skilled in the art and include simple substituted benzyl moieties wherein the nuclear substituent can be any common organic radical and the $\alpha$-substituent can be alkyl, phenyl or carbethoxy or $\alpha,\alpha$-dialkyl. Further, other protecting techniques can be employed including phenacyl, cyanomethyl and formation of an acetonide.

The starting reagents for the aforedescribed reaction schemes are either commercially available or can be prepared by one skilled in the art according to procedures outlined in the chemical literature. The requisite aldehydes and ketones can be synthesized according to the synthetic methods reported by Patai, "Chemistry of the Carbonyl Group," Interscience Publishers, 1966, New York, N.Y., chapters 4, 5 and 6; and Carnduff, Quart. Rev., 20, 169 (1966). The isonitriles are prepared from the corresponding N-formyl amine according to the procedure of Ugi et al., Chem. Ber., 94, 2814 (1961). In turn, the N-formyl amines are available via the Ritter reaction, outlined in "Organic Reactions," John Wiley & Sons, Inc., 1969, New York, N.Y., chapter 3, page 213.

As has been previously noted, compounds of the instant invention can form acid addition salts. Basic compounds of the present invention are converted to the acid addition salts by intereaction of the base with an acid either in an aqueous or non-aqueous medium. In a similar manner, treatment of the acid addition salts with an aqueous base solution, e.g., alkali metal hydroxides, alkali metal carbonates and alkali metal bicarbonates or with a metal cation which forms an insoluble precipitate with the acid anion, results in a regeneration of the free base form. Such conversions are best carried out as rapidly as possible and under temperature conditions and method dictated by the stability of said basic products. The bases thus regenerated may be reconverted to the same or a different acid addition salt.

In the utilization of the chemotherapeutic activity of those compounds of the present invention which form salts, it is preferred, of course, to use pharmaceutically acceptable salts. Although water-insolubility, high toxicity, or lack of crystalline nature may make some particular salt species unsuitable or less desirable for use as such in a given pharmaceutical application, the water-insoluble or toxic salts can be converted to the corresponding pharmaceutically acceptable bases by decomposition of the salt as described above, or alternately they can be converted to any desired pharmaceutically acceptable acid-addition salt.

Examples of acids which provide pharmaceutically acceptable anions are hydrochloric, hydrobromic, hydroiodic, nitric, sulfuric, or sulfurous, phosphoric, acetic, lactic, citric, tartaric, succinic, maleic, and gluconic.

As is obvious to one skilled in the art, compounds of the instant invention contain an asymmetric carbon atom at the side of the carbinol carbon atom on the amine bearing side chain. Thus, for each structure there is a pair of enantiomorphs which are exactly the same in their chemical and physical properties, but which differ in the direction they will rotate the plane of polarized light. Resolution of the pair into optically active isomers can be carried out by methods familiar to those skilled in the art and which are reviewed by Gilman, "Organic Chemistry—an Advanced Treatise," John Wiley & Sons, Inc., New York, N.Y., 1953, vol. I, chapter 4, page 214.

As previously indicated, 2-hydroxymethyl-3-hydroxy-6-(1-hydroxy-2-aminoethyl)pyridines of the present invention are all readily adapted to therapeutic use as smooth muscle relaxants and in particular as bronchodilators. Compounds notable for this therapeutic use with a high specificity for pulmonary as opposed to cardiac tissue include 2-hydroxymethyl-3-hydroxy-6-(1-hydroxy-2-isopropylaminoethyl)pyridine,
2-hydroxymethyl-3-hydroxy-6-(1-hydroxy-2-tert-butylaminoethyl)pyridine,
2-hydroxymethyl-3-hydroxy-6-[1-hydroxy-2-{3-(p-methoxyphenyl)-1-methylpropylamino}ethyl]pyridine,
2-hydroxymethyl-3-hydroxy-6-[1-hydroxy-2-{2-(p-hydroxyphenyl)-1-methylethylamino}ethyl]pyridine,
2-hydroxymethyl-3-hydroxy-6-[1-hydroxy-2-{2-(p-methoxyphenyl)-1-methylethylamino}ethyl]pyridine, and
2-hydroxymethyl-3-hydroxy-6-[1-hydroxy-2-{3-(p-hydroxyphenyl)-1-methylpropylamino}ethyl]pyridine.

The pyridylethanolamines and the pharmaceutically acceptable salts thereof, which are useful bronchodilators in mammals, may be administered either as individual therapeutic agents or as mixtures of therapeutic agents. They may be administered alone, but are generally administered with a pharmaceutical carrier selected on the basis of the chosen route of administration and standard pharmaceutical practice. For example, they may be combined with various pharmaceutically acceptable inert carriers in the form of tablets, capsules, lozenges, troches, hard candies, powders, aerosol sprays, aqueous suspensions or solutions, injectable solutions, elixirs, syrups and the like. Such carriers include solid diluents, or filters, sterile aqueous media and various nontoxic organic solvents. Moreover, the oral pharmaceutical compositions of this invention may be suitably sweetened and flavored by means of various agents of the type commonly used for this purpose.

The particular carrier selected and the proportion of active ingredient to carrier are influenced by the solubility and chemical nature of the therapeutic compounds, the chosen route of administration and the needs of the standard pharmaceutical practice. For example, where those compounds are administered orally in tablet form, excipients such as lactose, sodium citrate, calcium carbonate and dicalcium phosphate may be used. Various disintegrants such as starch, alginic acids, and certain complex slicates, together with lubricating agents such as magnesium stearate, sodium lauryl sulphate and talc, may also be used in producing tablets for the oral administration of these compounds. For oral administration in capsule form, lactose and high molecular weight polyethylene glycols are mong the preferred materials for use as pharmaceutically acceptable carriers. Where aqueous suspensions are to be used for oral administration, the compounds of this invention may be combined with emulsifying or suspending agents. Diluents such as ethanol, propylene glycol, glycerine and their combinations may be employed as well as other materials.

For purposes of parenteral administration and inhalation, solutions or suspensions of the instant compounds in sesame or peanut oil or in aqueous propylene glycol solutions can be employed, as well as sterile aqueous solutions of the soluble acid addition salts described hereinafter. These particular solutions are especially suited for intramuscular and subcutaneous injection purposes. The aqueous solutions, including those of the acid addition salts dissolved in pure distilled water, are also useful for intravenous injection purposes provided that their pH is properly adjusted beforehand. Such solutions should also be suitably buffered, if necessary, and the liquid diluent first rendered isotonic with sufficient saline or gluocse.

The compounds may be administered to subjects suffering from bronchoconstriction by means of inhalators or other devices which permit the active compounds to come into direct contact with the constricted areas of the tissues of the subject. When administered by means of a spray formulated as a 1% solution in an aqueous or nonaqueous solvent, e.g., Freons, utilization several times a day is preferred.

It is necessary that the active ingredient form a proportion of the composition such that a suitable dosage form will be obtained. Obviously, several dosage unit forms may be administered to about the same time. Although compositions with less than 0.005% by weight of active ingredient might be used in certain instances, it is preferred to use compositions containing not less than 0.005% of the active ingredient; otherwise the amount of carrier becomes excessively large. Activity increases with the concentration of the active ingredient. The composition may contain 10, 50, 75, 95 or an even higher percentage by weight of the active ingredient.

Although the use of the present invention is directed toward the treatment of mammals in general, the preferred subject is humans. In determining an efficacious dose for human therapy, results of animal testing are frequently extrapolated and a correlation is assumed between animal test behavior and proposed human dosage. When a commercially employed standard is available, the dose level of the clinical candidate in humans is frequently determined by comparison of its performance with the standard in an animal test. For example, theophylline is employed as a standard bronchodilator and is administered to humans at the rate of 150 to 300 mg. every 4 hours. It is assumed, then, that if compounds of the present invention have activity comparable to theophylline in the test assay, that similar doses will provide comparable responses in humans.

Obviously, the physician will ultimately determine the dosage which will be most suitable for a particular individual, and it will vary with the age, weight and response of the particular patient as well as with the nature and extent of the symptoms and the pharmacodynamic characteristics of the particular agent to be administered. Generally, small doses will be administered initially, with a gradual increase in the dosage until the optimum level is determined. It will often be found that when the composition is administered orally, larger quantities of the active ingredient will be required to produce the same level as produced by a small quantity administered parenterally.

Having full regard for the foregoing factors it is considered that an effective daily dosage of the compounds of the present invention in humans of approximately 1 to 20 mg. per day, with a preferred range of about 5 to 20 mg. per day in single or divided doses, or at about .07 to 0.28 mg./kg. of body weight will effectively alleviate bronchoconstriction in human subjects. These values are illustrative, and there may, of course, be individual cases where higher or lower dose ranges are merited.

The following examples are provided solely for the purpose of illustration and are not to be construed as limitations of this invention, many variations of which are possible without departing from the spirit or scope thereof.

EXAMPLE I 2-hydroxymethyl-3-hydroxy-6-(1-hydroxy-2-isopropylaminoethyl)pyridine dihydrochloride (A) 3-benzyloxy - 2,6 - bis(hydroxymethyl)pyridine hydrochloride.—To a solution of 252 g. of sodium hydroxide in 1.2 l. of water is added 600 g. of 3-hydroxypyridine and 1.26 l. of 35% aqueous formaldehyde and the mixture heated on a steam bath for 2 hours and subsequently cooled to room temperature. A solution of 750 ml. of benzyl bromide in 4.5 l. of ethanol is then added dropwise over a period of 70 minutes. After allowing the reaction mixture to stir for 16 hours, an additional 200 ml. of water containing 50 g. of sodium hydroxide and 150 ml. of benzyl bromide are added and the mixture heated at 85° C. for 2 hours.

The reaction mixture is cooled, concentrated in vacuo and the residual oil extracted in 6 l. of chloroform. The chloroform layer is washed with water, 5% sodium hydroxide solution and dried over sodium sulfate. Gaseous hydrogen chloride is bubbled into the chloroform layer until a precipitate of the product as the hydrochloride salt ceases to form. Filtration and drying provides the crude product, 943.6 g., M.P. 125–128° C.

A small sample is recrystallized for analysis, M.P. 128–130° C.

Analysis.—Calcd. for $C_{14}H_{16}ClNo_3$ (percent): C, 59.7; H, 5.7; N, 5.0. Found (percent): C, 59.8; H, 5.9; N, 4.6.

(B) 2-hydroxymethyl-3-benzyloxy - 6 - pyridinecarboxaldehyde.—To a refluxing suspension of 190 g. of activated manganese dioxide in 3.5 l. of benzene is added 95 g. of 3-benzyloxy-2,6-bis(hydroxymethyl)pyridine and refluxing continued for an additional 5 minutes. The suspension is filtered while warm and the filtrate concentrated in vacuo to an oil, 87.3 g.

The oil in chloroform is chromatographed through a silica gel column and eluted with chloroform in 500 ml. fractions. Fractions containing the desired material are combined, concentrated to dryness and the residual product recrystallized from ether, 19.05 g., M.P. 67–70° C. (Starting material was recovered from the column by elution with chloroform-methanol.) A one gram sample of the product is recrystallized further for analysis, M.P. 75.5–76° C.

Analysis.—Calcd. for $C_{14}H_{13}NO_3$ (percent): C, 69.1; H, 5.4; N, 5.8. Found (percent): C, 69.0; H, 5.4; N, 5.6.

(C) 2-hydroxymethyl - 3 - benzyloxy-6-(1-hydroxy-2-nitroethyl)pyridine.—A suspension of 30 g. of 2-hydroxymethyl-3-benzyloxy-6-pyridinecarboxaldehyde and 3.0 g. of potassium carbonate in 150 ml. of nitromethane is heated to reflux and maintained at that temperature for 10 minutes. The dark solution is filtered while hot and the filtrate concentrated in vacuo to an oil, 45 g., which is subsequently used without further purification.

(D) 2-hydroxymethyl-3-benzyloxy - 6 - (1-hydroxy-2-aminoethyl)pyridine.—The above crude 2-hydroxymethyl-3-benzyloxy-6-(1-hydroxy-2-nitroethyl)pyridine, 45 g., in 500 ml. of methanol containing sealed cubes of ice, is hydrogenated over 45 g. of Raney nickel in an atmosphere of hydrogen at an initial pressure of 50 p.s.i. After 1.3 hours hydrogen up-take ceases, the catalyst is filtered, and the filtrate concentrated under reduced pressure to an oil. The residual oil is partitioned between 400 ml. of chloroform and 100 ml. of water containing 6.5 ml. 12 N hydrochloric acid. The aqueous layer is separated, basified with sodium hydroxide solution to pH 11 and extracted with chloroform. The chloroform layer is separated, dried over sodium sulfate and concentrated in vacuo to an oil. The intermediate is employed in the next reaction without further purification.

(E) 2-hydroxymethyl - 3 - benzyloxy-6-(1-hydroxy-2-isopropylaminoethyl)pyridine.—A mixture of 18.8 g. of 2-hydroxymethyl-3-benzyloxy - 6 - (1-hydroxy-2-aminoethyl)pyridine, and 6.9 g. of sodium cyanoborohydride in 380 ml. of methanol containing 60 ml. of acetone and 30 ml. of 1.7 N ethanolic hydrogen chloride is allowed to stir at room temperature overnight. The reaction mixture is concentrated under reduced pressure and the residue partitioned between 250 ml. of chloroform and 75 ml. of water. The water layer is separated, basified with sodium hydroxide solution and the product extracted into chloroform. The chloroform layer is dried over sodium sulfate and concentrated in vacuo to a dark oil which is extracted with 2× 250 ml. of ether. The ether extracts are combined and concentrated in volume and cooled. The solid product, which crystallizes, is filtered and dried, 7.0 g., M.P. 83–85° C.

Analysis.—Calcd. for $C_{18}H_{24}N_3O_3$ (percent): C, 68.3; H, 7.8; N, 9.0. Found (percent): C, 68.4; H, 7.7; N, 8.8.

(F) 2-hydroxymethyl - 3 - hydroxy-6-(1-hydroxy-2-isopropylaminoethyl)pyridine dihydrochloride.—A solution of 7.0 g. of 2-hydroxymethyl-3-benzyloxy-6-(1-hydroxy-2-isopropylaminoethyl)pyridine in 150 ml. of methanol containing 4 ml. of water is hydrogenated over 2.0 g. of 5% palladium on charcoal at an initial pressure of 50 p.s.i. After one hour the hydrogenation is complete and the catalyst is filtered. Concentration of the filtrate under reduced pressure provides the crude base as an oil, which is dissolved in ethanol and treated with 2 equivalents of ethanolic hydrogen chloride. To the resulting hazy solution is added 30 ml. of isopropyl ether. After cooling overnight in a refrigerator, the product is filtered, 4.69 g., M.P. 186° C. dec.

Analysis.—Calcd. for $C_{11}H_{20}Cl_2N_2O_3$ (percent): C, 44.2; H, 6.8; N, 9.4. Found (percent): C, 44.2; H, 6.7; N, 9.4.

EXAMPLE II

Starting with 2-hydroxymethyl-3-benzyloxy-6-(1-hydroxy-2-aminoethyl)pyridine prepared in Example I(D) and the requisite ketone or aldehyde and repeating the procedures of Example I(E) and (F), the following compounds are prepared:

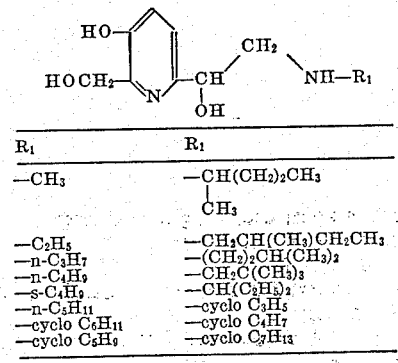

| $R_1$ | $R_1$ |
|---|---|
| —$CH_3$ | —$CH(CH_2)_2CH_3$<br>       |<br>     $CH_3$ |
| —$C_2H_5$ | —$CH_2CH(CH_3)CH_2CH_3$ |
| —n-$C_3H_7$ | —$(CH_2)_2CH(CH_3)_2$ |
| —n-$C_4H_9$ | —$CH_2C(CH_3)_3$ |
| —s-$C_4H_9$ | —$CH(C_2H_5)_2$ |
| —n-$C_5H_{11}$ | —cyclo $C_3H_5$ |
| —cyclo $C_6H_{11}$ | —cyclo $C_4H_7$ |
| —cyclo $C_5H_9$ | —cyclo $C_7H_{13}$ |

EXAMPLE III 2-hydroxymethyl-3-hydroxy-(1-hydroxy-2-tert-butylaminoethyl)pyridine dihydrochloride (A) N-tert-butyl-2-(5-benzyloxy - 6 - hydroxymethyl-2-pyridyl)-2-acetoxyacetamide.—A solution of 200 ml. of chloroform containing 30.0 g. of 2-hydroxymethyl-3-benzyloxy-6-pyridinecarboxaldehyde, 15 ml. of glacial acetic acid and 12.5 g. of t-butyl isonitrile is heated to reflux for 4 hours. The reaction is cooled and the chloroform extracted several times with aqueous sodium bicarbonate in order to remove the acetic acid present. The non-aqueous layer is separated, dried over sodium sulfate and concentrated in vacuo to viscous oil, 38 g., which is not further purified.

(B) N-tert-butyl - 2 - (5-benzyloxy-6-hydroxymethyl-2-pyridyl)-2-hydroxyacetamide hydrochloride.—The reaction mixture consisting of 38 g. of N-tert-butyl-2-(5-benzyloxy-6-hydroxymethyl - 2 - pyridyl)-2-acetoxyacetamide, 500 ml. of water and 25 ml. of 12 N hydrochloric acid solution is heated on a steam bath for 1.5 hours. The hot solution is decanted from an insoluble dark oil and the decant cooled overnight in a refrigerator. The precipitated monohydrochloride salt, which forms on standing, is filtered, 30 g. A small sample is recrystallized from ethanol, M.P. 195° dec. The remainder is treated with an aqueous sodium hydroxide solution and the resulting free base extracted into chloroform. The chloroform layer is separated, dried over sodium sulfate and concentrated under reduced pressure to dryness, 22 g., M.P. 128–130° C. A small sample is recrystallized from isopropyl ether, M.P. 128–129.5° C.

Analysis.—Calcd. for $C_{19}H_{24}N_2O_4$ (percent): C, 66.3; H, 7.0; N, 8.1. Found (percent): C, 65.5; H, 6.7; N, 8.0.

Analysis.—Calcd. for $C_{19}H_{24}N_2O_4 \cdot HCl$ (percent): C, 59.9; H, 6.4; N, 7.6. Found (percent): C, 59.8; H, 6.6; N, 7.2.

(C) 2-hydroxymethyl - 3 - benzyloxy-(1 - hydroxy-2-tert-butylaminoethyl)pyridine.—To 78 ml. of a 1 M solution of diborane in tetrahydrofuran under nitrogen and cooled to 0° C. is added dropwise over a period of 40 minutes 13.5 g. of N-tert-butyl-2-(5-benzyloxy-6-hydroxymethyl - 2 - pyridyl) - 2 - hydroxyacetamide in 250 ml. of the same solvent. The reaction mixture is allowed to stir at room temperature for 3.5 hours, and is then heated to reflux for 30 minutes and cooled to room temperature. Hydrogen chloride (70 ml.—1.34 N) in ethanol is added dropwise, followed by the addition of 300 ml. of ether. The mixture is allowed to stir for 1 hour and is then filtered, 11.0 g., M.P. 202° C., dec. The hydrochloride dissolved in water is treated with a sodium hydroxide solution to pH 11 and is extracted into chloroform (2× 250 ml.). The chloroform layer is dried over sodium sulfate, concentrated to dryness in vacuo, and the residue recrystallized from isopropyl ether, 3.78 g., M.P. 81–83.5° C.

(D) 2 - hydroxymethyl - 3 - hydroxy-(1 - hydroxy-2-tert-butylaminoethyl)pyridine dihydrochloride.—A solution of 1.7 g. of 2-hydroxymethyl - 3 - benzyloxy-(1-hydroxy - 2 - tert-butylaminoethyl)pyridine in 30 ml. of methanol containing 1.2 ml. of water is shaken with 700 mg. of 5% palladium-on-charcoal in an atmosphere of hydrogen at atmospheric pressure. In 17 minutes the theoretical amount of hydrogen has been consumed and the catalyst is filtered. Concentration of the filtrate under reduced pressure provides 1.4 g. of the crude product as an oil. Ethanol (5 ml.) is added to the residual oil followed by 6 ml. of 1.75 N ethanolic hydrogen chloride solution and, finally, by 5 ml. of isopropyl ether. The precipitated product is filtered and washed with isopropyl ether containing 20% ethanol, 1.35 g., M.P. 182° C. dec.

Analysis.—Calcd. for $C_{12}H_{22}Cl_2N_2O_3$ (percent): C, 46.0; H, 7.1; N, 8.9. Found (percent): C, 45.5; H, 7.1; N, 8.7.

EXAMPLE IV

The procedures of Example III(A)–(D) are repeated, starting with 2-hydroxymethyl-3-benzyloxy-6-pyridinecarboxaldehyde and the requisite isonitrile, to synthesize the following congeners:

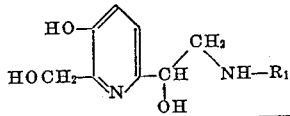

| $R_1$ | $R_1$ |
|---|---|
| $C_6H_5C(CH_3)_2-$ | $3-CH_3OC_6H_4C(CH_3)_2-$ |
| $4-CH_3OC_6H_4C(CH_3)_2-$ | $4-CH_3OC_6H_4(CH_2)_2C(CH_3)_2-$ |
| $2-CH_3OC_6H_4C(CH_3)_2-$ | $2-CH_3OC_6H_4(CH_2)_2C(CH_3)_2-$ |
| $C_6H_5C(CH_3)_2-$ | $4-HOC_6H_4(CH_2)_2C(CH_3)_2-$ |
| $C_6H_5CH_2C(CH_3)_2-$ | $3-HOC_6H_4(CH_2)_2C(CH_3)_2-$ |
| $4-CH_3OC_6H_4CH_2C(CH_3)_2-$ | $C_6H_5CH_2CH(CH_3)(C_2H_5)-$ |
| $4-HOC_6H_4CH_2C(CH_3)_2-$ | $4-CH_3OC_6H_4CH_2C(CH_3)(C_2H_5)-$ |
| $3-CH_3OC_6H_4(CH_2)_2C(CH_3)_2-$ | $2-HOC_6H_4CH_2C(CH_3)_2-$ |
| $3,4-(CH_3O)_2C_6H_3CH_2C(CH_3)_2-$ | $3,4-(CH_2O)_2C_6H_3CH_2C(CH_3)(C_2H_5)-$ |

EXAMPLE V 2-hydroxymethyl - 3 - hydroxy - 6 - [1-hydroxy-2-{3-(p-methoxyphenyl) - 1 - methylpropylamino}ethyl]pyridine dihydrochloride (A) 2 - hydroxymethyl-3-benzyloxy - 6 - [1-hydroxy-2-{3-(p-methoxyphenyl) - 1 - methylpropylamino}ethyl]pyridine.—To 50 ml. of methanol is added 4.1 g. of 2-hydroxymethyl-3-benzyloxy-6-(1-hydroxy - 2 - aminoethyl)pyridine, 3.5 g. of 4-(p-anisyl)-2-butanone, 5.5 ml. of 3.2 N hydrogen chloride in ethanol and 1.3 g. of sodium cyanoborohydride and the resulting mixture allowed to stir at room temperature for 72 hours. The reaction mixture is heated to reflux for one hour and then concentrated in vacuo to an oil which is partitioned between water-chloroform. Sufficient sodium hydroxide solution is added to the mixture to provide a pH of 11 and the organic layer is separated and the aqueous extracted (2× 100 ml.) with additional chloroform. The organic layers are combined, dried over sodium sulfate and concentrated under reduced pressure to an oil. The residual product is converted to the dihydrochloride salt by addition of 30 ml. of ethanol and 10 ml. of 3.2 N hydrogen chloride in the same solvent. The crude salt of the desired product, 3.8 g., M.P. 188° C., dec., is converted to the free base by treatment with an aqueous solution of sodium hydroxide followed by extraction into chloroform and subsequent removal of the solvent in vacuo.

(B) 2 - hydroxymethyl - 3 - hydroxy-6-[1-hydroxy-2-{3-(p - methoxyphenyl) - 1 - methylpropylamino}ethyl]pyridine dihydrochloride.—A suspension of 700 mg. of 5% palladium on charcoal in 50 ml. of methanol containing 1.48 g. of 2-hydroxymethyl - 3 - benzyloxy-6-[1-hydroxy-2-{3-(p-methoxyphenyl) - 1 - methylpropylamino}ethyl]pyridine and 1 ml. of water is shaken in a hydrogen atmosphere at an initial pressure of 50 p.s.i. for 90 minutes. The catalyst is filtered and the oil which remains, after the solvent is removed in vacuo, is treated with 8 ml. of ethanol and 3 ml. of 3.2 N hydrogen chloride in ethanol. Addition of 8 ml. of isopropyl ether followed by heating on a steam bath for a few minutes results in a solution from which precipitates the desired salt. The product is finally filtered and dried, 560 mg., M.P. 172° C., dec.

EXAMPLE VI

Starting with 2 - hydroxymethyl-3-benzyloxy-6-(1-hydroxy-2-aminoethyl)pyridine and the appropriate aldehyde or ketone, which are either commercial materials or reported in the chemical literature, and repeating the procedures of Example V, the following analogs are synthesized:

| $R_1$ | $R_1$ |
|---|---|
| $C_6H_5CH_2-$ | $4-CH_3OC_6H_4(CH_2)_3-$ |
| $C_6H_5(CH_2)_2-$ | $4-HOC_6H_4(CH_2)_3-$ |
| $C_6H_5(CH_2)_3-$ | $C_6H_5CH_2C(CH_3)_2CH_2-$ |
| $C_6H_5(CH_2)_4-$ | $C_6H_5C(CH_3)_2CH_2-$ |
| $4-CH_3OC_6H_4(CH_2)_2-$ | $4-CH_3OC_6H_4CH_2CH(C_2H_5)-$ |
| $2-CH_3OC_6H_4(CH_2)_2-$ | $4-HOC_6H_4(CH_2)_3CH(CH_3)-$ |
| $C_6H_5CH_2CH(CH_3)-$ | $3-HOC_6H_4(CH_2)_3CH(CH_3)-$ |
| $4-CH_3OC_6H_4CH_2CH(CH_3)-$ | $2-HOC_6H_4(CH_2)_2CH(CH_3)-$ |
| $4-HOC_6H_4CH_2CH(CH_3)-$ | $C_6H_5CH(C_2H_5)CH_2-$ |
| $3-HOC_6H_4CH_2CH(CH_3)-$ | $3-CH_3OC_6H_4(CH_2)_3CH(CH_3)-$ |
| $2-CH_3OC_6H_4(CH_2)_2CH(CH_3)-$ | $4-CH_3OC_6H_4(CH_2)_2CH(CH_3)-$ |
| $3,4-(CH_3O)_2C_6H_3CH_2-$ | $3,4-(CH_3O)_2C_6H_3CH_2CH(CH_3)-$ |
| $3,4-(CH_2O_2)C_6H_3(CH_2)_2-$ | $3,4-(CH_2O_2)C_6H_3CH_2-$ |
| $3,4-(CH_3O)_2C_6H_3(CH_2)_4-$ | $3,4-(CH_2O_2)C_6H_3(CH_2)_2CH(CH_3)-$ |

EXAMPLE VII

Bronchodilator activity

Conscious female guinea pigs, which have been fasted for 12 hours, receive oral or parenteral dosages of the compound which is to be tested for effectiveness. Control animals receive doses of saline solution which do not contain the compound which is under test. Subsequent to this administration, each animal is challenged with histamine aerosol.

The challenge procedure consists of spraying a 0.4 percent aqueous solution of histamine, at a pressure of 5 lb./in.² into an 8 x 8 x 12 inch plastic container for one minute. Immediately after the container is subjected to the histamine spray the animal is placed within it. At the end of one minute of exposure, the respiratory status, which is a reflection of bronchoconstriction, is evaluated. Evaluation levels are designated and scored as normal breathing (0), slightly deepened breathing (1), labored breathing (2), severely labored breathing and ataxis (3) and unconsciousness (4). Each group of animals contains 8 to 10 individuals and a control group containing the same approximate number is used. The scores for the control group and the group which has been treated with the compound under test are compared and the difference is expressed as percent protection.

The dose is given orally and the animals are challenged with histamine from 15–60 minutes later. The standard compound used is theophylline, which gives 25 percent protection when a dose of 60 mg./kg. is administered orally and the animal is challenged one hour later. When the compounds listed below are administered according to this procedure and the animals are challenged accordingly, the following percent protection is observed:

| $R_1$ | Dose, mg./kg. | Time,* min. | Pe proterc |
|---|---|---|---|
| $-C(CH_3)_3$ | 1.0 | 15 | 50 |
|  | 0.1 | 15 | 30 |
| $-CHCH_2-\langle\rangle-OH$ <br> $\mid$ <br> $CH_3$ | 1.0 | 15 | 47 |
|  | 0.1 | 15 | 42 |
|  | .01 | 15 | 22 |
| $-CHCH_2-\langle\rangle-OCH_3$ <br> $\mid$ <br> $CH_3$ | 1.0 | 15 | 53 |
|  | 0.1 | 15 | 52 |
|  | .01 | 15 | 22 |
| $-CH(CH_2)_2-\langle\rangle-OH$ <br> $\mid$ <br> $CH_3$ | 1.0 | 15 | 66 |
|  | 0.1 | 15 | 57 |
|  | .01 | 15 | 28 |
| $-CH(CH_2)_2-\langle\rangle-OCH_3$ <br> $\mid$ <br> $CH_3$ | 1.0 | 15 | 66 |
|  | 0.1 | 15 | 44 |
|  | 0.1 | 30 | 53 |
| Salbutamol | 1.0 | 15 | 50 |
|  | 0.1 | 15 | 30 |

*Interval between dosing with drug and challenging with histamine aerosol.

EXAMPLE VIII

Isloated guinea pig atria

As previously indicated compounds of the present invention displayed a specificity for pulmonary as opposed to cardiac tissue compared to other bronchodilators.

The positive chronotropic activities of the tested drug are measured using the atria of female Reed-Willett guinea pigs (600–1000 g.). The animals are sacrificed by a blow on the back of the head. The atria are quickly removed and dissected free of extraneous tissue in a 37° C. Tyrode's solution and is constantly oxygenated with a 95% $O_2$–5% $CO_2$ mixture. The atria are suspended under 2 g. tension in 10 ml. jacketed baths containing the same media. The beats were recorded via a statham face displacement transducer model FT .03 on a Grass Polygraph. Cumulative dose responses are obtained, adding drug aliquots every five minutes, the interval necessary for development of maximal chronotropic effects. Tissues were repeatedly washed in the 1–2 hour interval between determinations to restore rates to normal level.

Employing the above-described procedure three agents are compared, salbutamol, isoproterenol and 2-hydroxymethyl-3-hydroxy-6-(1-hydroxy - 2 - t - butylaminoethyl) pyridine dihydrochloride.

Concentration vs. response curves comparing percent maximum rate increase in the isolated guinea pig right atria with concentration of drug in mcg./ml. is illustrated in FIG. 1.

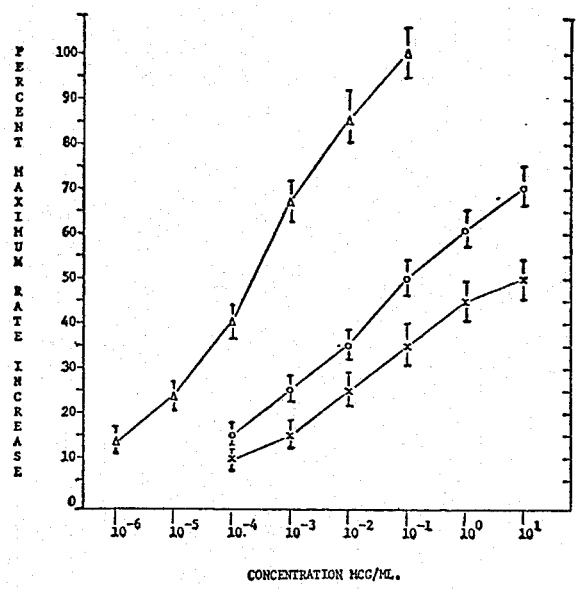

CONCENTRATION MCG/ML.
Fig. 1

Δ - Isoproterenol
o - Salbutamol
x - 2-hydroxymethyl-3-hydroxy-6-(1-hydroxy-2-t-butylaminoethyl)pyridine dihydrochloride I - ± stand. error

EXAMPLE IX

Starting with 2-hydroxymethyl - 3 - benzyloxy-6-(1-hydroxy-2-aminoethyl)-pyridine prepared in Example I(D) and the requisite ketone or aldehyde and repeating the procedures of Example I(E) and (F), the following congeners are prepared:

[Structure: pyridine with HO at 3-position, $HOCH_2$ at 2-position, and at 6-position $-CH(OH)-CH_2-NHR_1$]

| $R_1$ | $R_1$ |
|---|---|
| $C_6H_5OCH(CH_3)CH— $ with $CH_3$ | 2-pyridyl—$CH_2CH—$ with $C_2H_5$ |
| 2-$CH_3OC_6H_4OCH(CH_3)CH—$ with $CH_3$ | 3-indolyl—$CH_2CH—$ with $C_2H_5$ |
| 4-$CH_3OC_6H_4OCH(CH_3)CH—$ with $CH_3$ | $C_6H_5OCH(C_2H_5)CH—$ with $CH_3$ |
| 4-$CH_3OC_6H_4OCH_2CH—$ with $C_2H_5$ | 2-pyridyl—$CH_2CH—$ with n-$C_3H_7$ |
| 2-$HOC_6H_4OCH(CH_3)CH_2—$ | 2-pyridyl—$(CH_2)_3CH—$ with $CH_3$ |
| 2-pyridyl—$(CH_2)_3—$ | 4-pyridyl—$(CH_2)_3CH—$ with $CH_3$ |
| 3-pyridyl—$(CH_2)_3—$ | 2-thienyl—$(CH_2)_2—$ |
| 2-furyl—$(CH_2)_3—$ | 2-thienyl—$(CH_2)_4—$ |
| 2-pyridyl—$(CH_2)_4—$ | 2-furyl—$(CH_2)_5—$ |

EXAMPLE X

The procedures of Example III(A)–(D) are repeated, starting with the requisite isonitrile and 2-hydroxymethyl-3-benzyloxy-6-pyridinecarboxaldehyde, to provide the following analogs:

[Structure: pyridine with HO at 3-position, $HOCH_2$ at 2-position, and at 6-position $-CH(OH)-C(CH_3)_2-NH-R_1$]

| $R_1$ | $R_1$ |
|---|---|
| $C_6H_5OCH_2C(CH_3)_2—$ | (n-$C_3H_7)_2N(CH_2)_2C(CH_3)_2—$ |
| 4-$CH_3OC_6H_4OCH_2C(CH_3)_2—$ | 2-furyl—$CH_2C(CH_3)_2—$ |
| 4-$CH_3OC_6H_4OCH(CH_3)_2C(CH_3)_2—$ | $(CH_3)_2NCH_2C(CH_3)(C_2H_5)—$ |
| $(CH_3)_2NCH_2C(CH_3)_2—$ | 2-thienyl—$(CH_2)_2C(CH_3)_2—$ |
| $(C_2H_5)_2NCH(CH_3)C(CH_3)_2—$ | 2-$CH_3OC_6H_4OCH_2C(CH_3)(C_2H_5)—$ |
| $(C_2H_5)_2NCH_2CHCH_2—$ with $CH_3$ | $(C_2H_5)_2NCH(CH_3)CH—$ with $CH_3$ |
| $(C_2H_5)_2N(CH_2)_3—$ | $(C_2H_5)_2NCH_2CH—$ with $C_2H_5$ |
| $(C_2H_5)_2NC(CH_3)_2CH_2—$ | $(CH_3)_2NCH(CH_3)CH—$ with $CH_3$ |
| $(CH_3)_2NCH_2C(CH_3)_2CH_2—$ | $(CH_3)_2NCH_2CH(CH_3)CH—$ with $CH_3$ |
| $(CH_3)_2NCH(CH_3)CH_2—$ | $CH_3NH(CH_2)_2CH—$ with $CH_3$ |
| $(CH_3)_2NCH_2CH—$ with $CH_3$ | 1-$C_3H_7NHC(CH_3)_2CH—$ with $CH_3$ |
| $(C_2H_5)_2NCH_2CH—$ with $CH_3$ | $(CH_3)_2N(CH_2)_3CH—$ with $CH_3$ |
| $(CH_3)_2N(CH_2)_4—$ | $(C_2H_5)_2N(CH_2)_3CH—$ with $CH_3$ |
| (1-$C_3H_7)_2N(CH_2)_4—$ | $C_2H_5NHC(CH_3)(C_2H_5)CH—$ with $CH_3$ |
| $(C_2H_5)_2NCH_2CH(C_2H_5)CH_2—$ | $(C_2H_5)_2N(CH_2)_2CH—$ with $CH_3$ |

TABLE—Continued

| R₁ | R₁ |
|---|---|
| (C₂H₅)₂N(CH₂)₃— | C₆H₅O(CH₂)₃— |
| C₆H₅OCH(CH₃)(CH₂)₂— | 2-pyridyl—CH₂CH—<br>              CH₃ |
| C₆H₅OCH₂CH—<br>        CH₃ | 3-indolyl—CH₂CH—<br>             CH₃ |
| 3-HOC₆H₄OCH₂CH—<br>            CH₃ | 2-furyl—CH₂CH—<br>         C₂H₅ |
| 2-HOC₆H₄OCH₂CH—<br>            CH₃ | 2-furyl—(CH₂)₂CH—<br>              CH₃ |

EXAMPLE XI

Tablets

A tablet base is prepared by blending the following ingredients in the proportion by weight indicated:

| | |
|---|---|
| Sucrose, U.S.P. | 80.3 |
| Tapioca starch | 13.2 |
| Magnesium stearate | 6.5 |

Into this tablet base there is blended sufficient 2-hydroxymethyl-3-hydroxy-6-(1 - hydroxy-2-tert-butylaminoethyl)pyridine to provide tablets containing 20, 100 and 250 mg. of active ingredient per tablet. The compositions are each compressed into tablets, each weighing 360 mg., by conventional means.

EXAMPLE XII

Capsules

A blend is prepared containing the following ingredients:

| | |
|---|---|
| Calcium carbonate, U.S.P. | 17.6 |
| Dicalcium phosphate | 18.8 |
| Magnesium trisilicate, U.S.P. | 5.2 |
| Lactose, U.S.P. | 5.2 |
| Potato starch | 5.2 |
| Magnesium stearate A | 0.8 |
| Magnesium stearate B | 0.35 |

To this blend is added sufficient 2-hydroxymethyl-3-hydroxy-6-[1-hydroxy-2-{3 - (p - methoxyphenyl)-1-methylpropylamino}ethyl]pyridine to provide capsules containing 5, 10 and 25 mg. of active ingredient per capsule. The compositions are filled into conventional hard gelatin capsules in the amount of 350 mg. per capsule.

EXAMPLE XIII

Injectable preparation

One thousand grams of 2-hydroxymethyl-3-hydroxy-6-(1 - hydroxy-2-isopropylaminoethyl)pyridine dihydrochloride are intimately mixed and ground with 2500 grams of sodium ascorbate. The ground dry mixture is placed in vials and sterilized with ethylene oxide after which the vials are sterilely stoppered. For intravenous administration, sufficient water is added to the materials in the vials to form a solution containing 1.0 mg. of active ingredient per milliliter of injectable solution.

EXAMPLE XIV

Solution

A solution of 2 - hydroxymethyl-3-hydroxy-6-(1-hydroxy- 2 - tert-butylaminoethyl)pyridine dihydrochloride is prepared with the following composition:

| | |
|---|---|
| Effective ingredient _____ grams__ | 6.04 |
| Magnesium chloride hexahydrate _____ do____ | 12.36 |
| Monoethanolamine _____ ml__ | 8.85 |
| Propylene glycol _____ grams__ | 376.00 |
| Water, distilled _____ ml__ | 94.00 |

The resultant solution has a concentration of effective ingredient of 10 mg./ml. and is suitable for parenteral and especially for intramuscular administration.

EXAMPLE XV

Suspension

A suspension of 2 - hydroxymethyl-3-hydroxy-6-[1-hydroxy - 2 - {2-(p-hydroxyphenyl)-1-methylethylamino} ethyl]pyridine dihydrochloride is prepared with the following comoposition:

| | |
|---|---|
| Effective ingredient _____ g__ | 25.00 |
| 70% aqueous sorbitol _____ g__ | 741.29 |
| Glycerine, U.S.P. _____ g__ | 185.35 |
| Gum acacia (10% solution) _____ ml__ | 100.00 |
| Polyvinylpyrrolidone _____ g__ | 0.50 |
| Distilled water—Sufficient to make 1 liter. | |

To this suspension, various sweeteners and flavorants are added to improve the palatability of the suspension. The suspension contains approximately 25 mg. of effective agent per milliliter.

EXAMPLE XVI

Starting with 2-hydroxymethyl-3-benzyloxy-6-pyridinecarboxaldehyde and the appropriate nitroalkane and ketone or aldehyde, and following the experimental procedure of Example I(C)–(F), the following products are prepared:

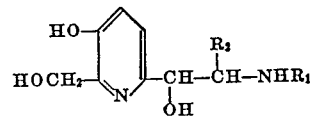

| R₁ | R₂ |
|---|---|
| CH₃— | CH₃— |
| i-C₃H₇— | CH₃— |
| n-C₄H₉— | CH₃— |
| s-C₄H₉— | CH₃— |
| n-C₅H₁₁— | CH₃— |
| Cyclo—C₆H₁₁— | CH₃— |
| C₆H₅CH₂CH(CH₃)— | CH₃— |
| C₆H₅CH₂CH(CH₃)— | C₂H₅— |
| C₆H₅CH₂CH(CH₃)— | n-C₃H₇— |
| 4-CH₃OC₆H₄(CH₂)₂CH(CH₃)— | CH₃— |
| 4-CH₃OC₆H₄(CH₂)₂CH(CH₃)— | C₂H₅— |
| 4-HOC₆H₄CH₂CH(CH₃)— | CH₃— |
| 4-HOC₆H₄CH₂CH(CH₃)— | n-C₃H₇— |
| 3,4-(CH₃O)₂C₆H₃CH₂CH(CH₃)— | CH₃— |
| C₆H₅O(CH₂)₃— | CH₃— |
| 4-HOC₆H₄OCH(CH₃)CH₂— | CH₃— |
| 2-pyridyl—(CH₂)₃— | CH₃— |
| 3,4-(CH₂O₂)C₆H₃(CH₂)₃— | CH₃— |
| 2-furyl—(CH₂)₃— | C₂H₅— |
| 2-thienyl—(CH₂)₃— | C₂H₅— |
| (C₂H₅)₂NCH₂CH(CH₃)CH₂— | C₂H₅— |
| CH₃NH(CH₂)₂CH(CH₃)— | C₂H₅— |
| C₆H₅(CH₂)₃— | n-C₃H₇— |
| 3-indolyl— | n-C₃H₇— |
| 3,4-(CH₃O)₂C₆H₃(CH₂)₃— | n-C₃H₇— |
| 3,4-(CH₂O₂)C₆H₃(CH₂)₃— | n-C₃H₇— |
| i-C₃H₇— | i-C₃H₇— |
| cyclo-C₆H₉— | i-C₃H₇— |
| 4-HOC₆H₄(CH₂)₂CH(CH₃)— | i-C₃H₇— |
| (C₂H₅)₂NCH₂CH(CH₃)— | i-C₃H₇— |

EXAMPLE XVII 2-hydroxymethyl-3-hydroxy-6-(1-hydroxy-2-tert-butylamino-propyl)pyridine dihydrochloride (A) 2-phenyl - 3 - oxo - 2,3 - dihydro-7-(1-hydroxypropyl)-5H - [1,4] - dioxepino[6,5-b]pyridine.—To an aqueous solution of 16.0 g. (0.4 mole) of sodium hydroxide in 160 ml. of water is added 32.3 g. (0.2 mole) of 3-hydroxy-2-hydroxymethylpyridine hydrochloride and the resulting solution warmed to 90° C. A solution of 13.9 g. (0.24 mole) of propionaldehyde in 40 ml. of ethanol is added dropwise over a period of one hour while the temperature of the reaction mixture is maintained at 90° C. After sixteen hours of continuous heating, 53.5 g. (0.22 mole) of ethyl α-bromophenylacetate in 60 ml. of ethanol is added and heating at 90° C. maintained for an additional six hours. The reaction mixture is cooled, the majority of the ethanol removed in vacuo and 500 ml. of chloroform added. The organic phase is washed with 2% sodium hydroxide solution and the product extracted from the chloroform with 100 ml. of 5% hydrochloric acid solution. The aqueous acid solution is back-washed with chloroform and finally neutralized with 5% sodium hydroxide solution. The product is extracted (2× 100 ml.) into chloroform and the organic phase separated, dried over sodium sulfate and concentrated under reduced pressure to provide the desired product as a viscous oil. The product is further purified by chromatographing on a silica-gel column.

(B) 2 - phenyl - 3 - oxo-2,3-dihydro-7-propionyl-5H-[1,4]-dioxepino[6,5-b]pyridine.—Twenty grams of 2-phenyl-3-oxo - 2,3 - dihydro-7-(1 - hydroxypropyl)-5H-[1,4]-dioxepino[6,5-b]pyridine are combined with 40 g. of activated manganese dioxide in 600 ml. of benzene and the resulting mixture heated to reflux for four hours during which time water is removed from the reaction with a Dean Stark trap. The mixture is filtered hot, the filtered solids washed with benzene and the combined washings and filtrate concentrated in vacuo. The residual, semi-crystalline product is purified by recrystallization from ether.

(C) 2 - phenyl - 3 - oxo - 2,3 - dihydro - 7 - (α - bromopropionyl) - 5H - [1,4] - dioxepino[6,5 - b]pyridine.—A solution of 14.9 g. (0.05 mole) of the above oxidation product, 2 - phenyl - 3 - oxo - 2,3-dihydro-7-propionyl-5H-[1,4]-dioxepino[6,5-b]pyridine, in 150 ml. of glacial acetic acid is warmed to 75° C. and treated with 8.0 g. (0.05 mole) of bromine in 60 ml. of the same solvent. Heating and stirring are maintained for one hour, after which the reaction mixture is cooled and the precipitated hydrobromide salt of the product is filtered. The filtered cake is suspended in 200 ml. of chloroform and sufficient 2% sodium hydroxide solution added to neutralize the hydrobromide salt. The chloroform layer is separated, dried over sodium sulfate and concentrated in vacuo. The resulting product is used directly in subsequent reactions without further purification.

(D) 2 - phenyl - 3 - oxo - 2,3 - dihydro - 7 - (1 - hydroxy-2-bromopropyl)-5H-[1,4] - dioxepino[6,5 - b]pyridine.—To 11.3 g. (0.03 mole) of the above bromo ketone, 2-phenyl-3-oxo-2,3-dihydro-7-(α-bromopropionyl)-5H-[1,4]-dioxepino[6,5-b]pyridine, in 200 ml. of methanol is added 1.52 g. (0.04 mole) of sodium borohydride in 10 ml. of water. The reaction mixture is allowed to stir at room temperature, after which it is concentrated in vacuo to 50 ml. The concentrate is treated with 50 ml. of water and 100 ml. of chloroform, and the organic layer subsequently separated, dried over sodium sulfate and concentrated under reduced pressure. The oily residue is used without further purification.

(E) 2 - hydroxymethyl - 3 - (α - [N - tert - butylcarbamyl]benzyloxy) - 6 - (1 - hydroxy - 2 - tert-butylaminopropyl)pyridine.—Eleven grams (0.15 mole) of tert-butylamine is added to 150 ml. of ethanol containing 11 g. (0.03 mole) of 2-phenyl-3-oxo-2,3-dihydro-7-(1-hydroxy-2-bromopropyl)-5H-[1,4]-dioxepino[6,5-b]pyridine. The resulting solution is heated to reflux for 2 hours, and is then cooled and the solvent removed in vacuo. The residue is extracted with chloroform which, in turn, is washed with water and dried over sodium sulfate. Removal of the solvent under reduced pressure provides the crude product, which is used without further purification.

(F) 2 - hydroxymethyl - 3 - hydroxy - 6 - (1 - hydroxy-2-tert-butylaminopropyl)pyridine dihydrochloride.—Five grams of 2-hydroxymethyl-3-(α-[N-tert-butyclarbamyl]benzyloxy-6-(1-hydroxy-2 - tert - butylaminopropyl)pyridine and 1 g. of 10% palladium on charcoal in 100 ml. of methanol containing 1 ml. of water is shaken in a hydrogen atmosphere at an initial pressure of 14 p.s.i. After one equivalent of hydrogen has been taken up, the catalyst is filtered and the filtrate concentrated to a small volume. The residue is treated with 20 ml. of 1 N hydrochloric acid solution, washed with chloroform and 500 ml. of ethanol added to the aqueous acid solution. The aqueous-ethanol solution is concentrated in vacuo to remove excess water and the residual concentrate treated with ether to precipitate the hydrochloride salt of the desired product. Further purification is effected by recrystallization from ethanol-ether.

EXAMPLE XVIII

Starting with 3-hydroxy-2-hydroxymethylpyridine, the appropriate aldehyde and the requisite amine, and following the procedures of Example XVII(A)–(F), the following congeners are prepared:

| R₁ | R₂ |
|---|---|
| C₂H₅C(CH₃)₂— | CH₃— |
| C₆H₅C(CH₃)₂— | CH₃— |
| 4-CH₃OC₆H₄C(CH₃)₂— | CH₃— |
| C₆H₅CH₂C(CH₃)₂— | CH₃— |
| 4-CH₃OC₆H₄CH₂C(CH₃)₂— | CH₃— |
| 4-HOC₆H₄CH₂C(CH₃)₂— | CH₃— |
| 3,4-(CH₃O)₂C₆H₃C(CH₃)₂— | CH₃— |
| 3,4-(CH₂O₂)C₆H₃C(CH₃)₂— | CH₃— |
| 4-HOC₆H₄CH₂C(CH₃)₂— | CH₃— |
| 4-CH₃OC₆H₄CH₂C(CH₃)(C₂H₅)— | CH₃— |
| 4-HOC₆H₄C(CH₃)₂— | C₂H₅— |
| 4-HOC₆H₄CH₂C(CH₃)₂— | C₂H₅— |
| 3,4-(CH₃O)₂C₆H₃C(CH₃)₂— | C₂H₅— |
| 3-HOC₆H₄(CH₂)₂C(CH₃)₂— | C₂H₅— |
| 3,4-(CH₂O₂)C₆H₃CH₂C(CH₃)₂— | C₂H₅— |
| C₆H₅OCH₂C(CH₃)₂— | C₂H₅— |
| C₆H₅OCH₂C(CH₃)₂— | CH₃— |
| (CH₃)₂NCH₂C(CH₃)₂— | CH₃— |
| (CH₃)₂NCH₂C(CH₃)₂— | C₂H₅— |
| 2-thienyl—(CH₂)₂C(CH₃)₂— | CH₃— |
| (n-C₃H₇)₂N(CH₂)₂C(CH₃)₂— | CH₃— |
| (n-C₃H₇)₂N(CH₂)₂C(CH₃)₂— | C₂H₅— |
| 4-CH₃OC₆H₄OCH₂C(CH₃)₂— | CH₃— |
| 4-CH₃OC₆H₄OCH₂C(CH₃)₂— | C₂H₅— |
| 2-furyl—C(CH₃)₂— | CH₃— |
| 2-furyl—(CH₃)₂— | n-C₃H₇— |
| 4-HOC₆H₄CH₂C(CH₃)₂— | n-C₃H₇— |
| 4-HOC₆H₄CH₂C(CH₃)₂— | i-C₃H₇— |
| 4-CH₃OC₆H₄(CH₂)₂C(CH₃)₂— | i-C₃H₇ |
| 4-CH₃OC₆H₄(CH₂)₂C(CH₃)₂— | n-C₃H₇— |
| 3,4-(CH₂O₂)C₆H₃CH₂C(CH₃)₂— | n-C₃H₇ |

Preparation A

Isonitriles.—The following isonitriles (isocyanides), not previously reported in the chemical literature, are prepared according to the procedure of Ugi et al., Chem. Ber., 94, 2814 (1961), which consists of the reaction of an N-formyl amine with phosphene (COCl₂) in the presence of triethylamine in a reaction-inert solvent:

R₁NC

| R₁ | R₁ |
|---|---|
| C₆H₅C(CH₃)₂— | 3-CH₃OC₆H₄C(CH₃)₂— |
| 4-CH₃OC₆H₄C(CH₃)₂— | 4-CH₃OC₆H₄(CH₂)₂C(CH₃)₂— |
| 2-CH₃OC₆H₄C(CH₃)₂— | 2-CH₃OC₆H₄(CH₂)₂C(CH₃)₂— |
| C₂H₅C(CH₃)₂— | 4-C₆H₅CH₂OC₆H₄(CH₂)₂C(CH₃)₂— |
| C₆H₅CH₂C(CH₃)₂— | 3-C₆H₅CH₂OC₆H₄(CH₂)₂C(CH₃)₂— |
| 4-CH₃OC₆H₄CH₂C(CH₃)₂— | C₆H₅CH₂C(CH₃)(C₂H₅)— |
| 4-C₆H₅CH₂OC₆H₄CH₂C(CH₃)₂— | 4-CH₃OC₆H₄CH₂C(CH₃)(C₂H₅)— |
| 3-CH₃OC₆H₄(CH₂)₂C(CH₃)₂— | 2-C₆H₅CH₂OC₆H₄CH₂C(CH₃)₂— |
| 3-C₆H₅CH₂OC₆H₄(CH₂)₂C(CH₃)₂— | (n-C₃H₇)₂N(CH₂)₂O(CH₃)₂— |
| C₆H₅OCH₂C(CH₃)₂— | (CH₃)₂NCH₂C(CH₃)(C₂H₅)— |
| 4-CH₃OC₆H₄OCH₂C(CH₃)₂— | 2-furyl—CH₂C(CH₃)₂— |
| 4-CH₃OC₆H₄O(CH₂)₂C(CH₃)₂— | 2-thienyl—(CH₂)₂C(CH₃)₂— |
| (CH₃)₂NCH₂C(CH₃)₂— | 2-CH₃OC₆H₄OCH₂C(CH₃)(C₂H₅)— |
| (C₂H₅)₂NCH(CH₃)C(CH₃)₂— | |

Preparation B

N-formylamines.—Starting with the appropriate tertiary alcohol and employing the experimental procedures of Ritter et al., J. Am. Chem. Soc., 70, 4048 (1948), and Moed et al., Rec. Trav. Chim., 74, 919 (1955), the following N-substituted formamides previously unreported in the literature are synthesized:

| $R_1$ | $R_1$ |
|---|---|
| 2-CH₃OC₆H₄C(CH₃)₂— | 4-CH₃OC₆H₄(CH₂)₂C(CH₃)₂— |
| 4-CH₃OC₆H₄(CH₃)₂— | 2-CH₃OC₆H₄(CH₂)₂C(CH₃)₂— |
| 4-CH₃C₆H₄CH₂C(CH₃)₂— | 4-C₆H₅CH₂OC₆H₄(CH₂)₂C(CH₃)₂— |
| 4-C₆H₅CH₂OC₆H₄CH₂C(CH₃)₂— | 3-C₆H₅CH₂OC₆H₄(CH₂)₂C(CH₃)₂— |
| 3-CH₃OC₆H₄(CH₂)₂C(CH₃)₂— | 4-CH₃OC₆H₄CH₂C(CH₃)(C₂H₅)— |
| 3-C₆H₅CH₂OC₆H₄(CH₂)₂C(CH₃)₂— | 2-C₆H₅CH₂OC₆H₄CH₂C(CH₃)₂— |
| 3-CH₃OC₆H₄C(CH₃)₂— | (n-C₃H₇)₂N(CH₂)₂C(CH₃)₂— |
| C₆H₅OC₆H₄C(CH₃)₂— | (CH₃)₂NCH₂C(CH₃)(C₂H₅)— |
| 4-CH₃OC₆H₄O(CH₂)₂C(CH₃)₂— | 2-furyl-CH₂C(CH₃)₂— |
| (CH₃)₂NCH₂C(CH₃)₂— | 2-thienyl-(CH₂)₂C(CH₃)₂— |
| (C₂H₅)₂NCH(CH₃)C(CH₃)₂— | 2-CH₃OC₆H₄OCH₂C(CH₃)— |
| 3,4-(CH₃O)₂C₆H₃CH₂C(CH₃)₂— | 3,4-(CH₂O₂)C₅H₃CH₂C(CH₃)(C₂H₅)— |

What is claimed is:

1. The method of relaxing smooth muscle in a mammalian subject which comprises contacting said smooth muscle with an effective amount of a compound selected from the group consisting of a compound of the formula:

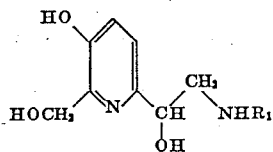

and a pharmaceutically acceptable salt thereof wherein $R_1$ is selected from the group consisting of hydrogen, alkyl containing from 1 to 5 carbon atoms and phenylalkyl and substituted phenylalkyl wherein said alkyl group contains from 3 to 5 carbon atoms and said substituent is selected from the group consisting of hydroxy, methoxy 3,4-dimethoxy and 3,4-methylenedioxy.

2. The method of claim 1 wherein said smooth muscle is bronchial tissue.

3. The method of claim 2 wherein $R_1$ is alkyl containing from 1 to 5 carbon atoms.

4. The method of claim 3 wherein $R_1$ is iso-propyl.

5. The method of claim 3 wherein $R_1$ is tert-butyl.

6. The method of claim 2 wherein $R_1$ is substituted phenylalkyl wherein said alkyl contains from 3 to 5 carbon atoms.

7. The method of claim 6 wherein $R_1$ is 3-(4'-methoxyphenyl)-1-methylpropyl of the formula:

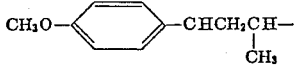

8. The method of claim 6 wherein $R_1$ is 3-(4'-hydroxyphenyl)-1-methylpropyl of the formula:

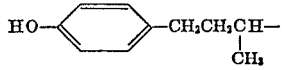

9. The method of claim 6 wherein $R_1$ is 2-(4' methoxyphenyl)-1-methylethyl of the formula:

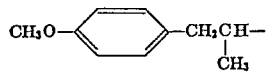

10. The method of claim 6 wherein $R_1$ is 2-(4'-hydroxyphenyl)-1-methylethyl of the formula:

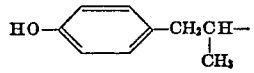

References Cited

UNITED STATES PATENTS 3,433,796   3/1969   Nauto   260—290 AE

STANLEY J. FRIEDMAN, Assistant Examiner

UNITED STATES PATENT AND TRADEMARK OFFICE

CERTIFICATE EXTENDING PATENT TERM
UNDER 35 U.S.C. 156

Patent No.   : 3,786,160

Dated        : January 15, 1974

Inventor(s)  : Wayne E. Barth

Patent Owner : Pfizer, Inc.

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this Twenty-second day of December 1987.

Donald J. Quigg

Assistant Secretary and Commissioner of Patents and Trademarks